United States Patent Office 3,400,099
Patented Sept. 3, 1968

3,400,099
STEREOLINEAR BUTADIENE STABILIZED WITH
A COMBINATION OF STABILIZERS
Wendell S. Cook, Canal Fulton, Ohio, assignor to The
Firestone Tire & Rubber Company, Akron, Ohio, a corporation of Ohio
No Drawing. Filed Oct. 18, 1963, Ser. No. 317,132
21 Claims. (Cl. 260—45.85)

ABSTRACT OF THE DISCLOSURE

Stereolinear polybutadiene prepared by polymerization with a lithium-based catalyst is stabilized by a 2-component stabilizer mixture. One component is thiodipropionic amides, dialkyl amides, nitriles or esters. The other component is any one of various phenols (including N-acyl-p-aminophenols, bisphenols and trisphenols) and di-t-alkyl diphenylamines.

This invention relates to the stabilization of polymeric materials produced by the polymerization, by means of lithium-based catalysts, of butadiene alone or by mixtures of butadiene with minor proportions of other monomeric substances which are copolymerizable therewith and whose presence in the polymeric chain does not disturb the essential character of the butadiene polymer configuration. Butadiene when polymerized alone in the presence of lithium-based catalysts results in polymers exhibiting, by infra-red technique 25 to 85 percent cis-1,4-structure and substantially 6 to 15 percent 1,2-structure, the balance being trans-1,4-structure. When butadiene is polymerized with these catalysts in the presence of minor proportions of other unsaturated monomers, the portions of the polymeric chains derived from the butadiene retain this same essential character.

While in many instances the butadiene polymers being discussed and with which the invention is concerned are polybutadienes, it is to be understood that these polymers include in addition to homopolymers of butadiene, also copolymers of butadiene with vinyl monomers such as styrene, o-, m- and p-methyl styrene, α-methyl styrene, the various dimethyl styrenes, indene, vinyl pyridine, vinyl naphthalene, isobutene, acrylonitrile, allyl benzene, allyl toluene, allyl naphthalene, stilbene, methyl stilbene, 1,3-diphenyl-1-butene, isoprene, triphenylethylene, halogen-substituted derivatives of the foregoing and the like. In the case of such copolymers, the polymers contain from about 5 percent to 50 percent by weight vinyl monomer and correspondingly from about 95 percent to 50 percent by weight butadiene-1,3 and are highly unsaturated polymers. In many instances, the comonomers may have some tendency to form block copolymers with the butadiene, i.e., to enter the polymeric chains in a non-statistical distribution along the length of the chain. Such products are useful in many applications; however, if it is desired to obtain polymers in which the monomer residues are statistically distributed in random configuration, the concentration of the more rapidly polymerizing monomer may be kept at a low and constant value, by charging the monomers initially with the more rapidly polymerizing monomer at a low concentration with respect to the other monomers, and adding the further amounts of the more rapidly polymerizing monomer incrementally during the polymerization. For example, styrene polymerizes more slowly than butadiene with lithium-based catalysts; thus, if it is desired to obtain a polymer of uniform configuration containing say 20 percent of styrene statistically distributed along the chains, there will be charged initially a mixture of 70 percent styrene and 30 percent butadiene. As the polymerization proceeds, the butadiene is replenished continuously or at frequent intervals by addition of butadiene or a mixture of butadiene and styrene in the proportions desired in the final polymer. Empirically it has been found that this result may be achieved by feeding butadiene alone at a rate such as to keep the reaction pressure constant at its original value.

There may be included in a polymerization recipe for a butadiene polymer which otherwise would undesirably flow at ordinary storage or handling temperatures, a trace amount of a multifunctional monomeric compound capable of adding to a butadiene and/or its polymeric sequences under polymerization conditions. The amount employed will vary to some extent from about 0.025 to 0.4 part of the multifunctional monomeric compound depending on the one hand upon the inherent viscosity of the butadiene polymers and consequent magnitude of the flow problem, and on the other hand upon the concentration of the multifunctional monomeric compound which will produce substantial gel in the polymer, gel being highly undesirable in such polymers. Although divinyl benzene for economic reasons is a preferred multifunctional monomeric compound, multifunctional monomeric compounds generally which are effective include without restriction the other multifunctional aromatic compounds of which trivinyl benzene, tetravinyl benzene, divinyl xylenes, divinyl anthracene, divinyl naphthalene, and divinyl durene are respresentative, the multifunctional acetylenes of which divinyl acetylene, divinyl diacetylene, divinyl triacetylene, diallyl acetylene and diallyl diacetylene are representative, 4,4'-divinyl azobenzene, 4,4'-divinylphenylether, 4,4'-divinylphenyl sulfide, 4,4'-divinylphenyl disulfide, 4,4'- bis(vinylphenyl)methane, 4,4'-bis(vinylphenyl)ethane, 4,4'-bis(vinylphenyl) amine, diallyl, azodiallyl, vinyl phosphate, diallyl phosphate, triallyl phosphate and ethylene dimethacrylate.

The polymerization may be carried out in bulk, in processes in which the butadiene and other monomers are brought into contact with the catalysts in the absence of any solvents, or in the presence of solvents. The polymerization may also be carried out in the presence of plasticizing oils or of carbon black or other pigments designed to remain in the final product, or these materials may be added to the polymerization solution at the close of the reaction. Thus 20, 30, 40 or even more parts of carbon black, or of plasticizing oils may be incorporated in the polymer in this manner.

The linear polybutadienes of this invention are typically water white and contain no more than a few tenths of a percent of gel. The low level of catalyst required for producing the polymerization results in no heavy metal residue in the polymer. The polymer is therefore relatively free of material that would tend to discolor or cause deterioration upon aging.

The polybutadienes of linear molecular structure are formed, suitably at a temperature of 0 to 100° C., using about 0.0001 to about 0.1 gram of active lithium as a lithium-based catalyst per 100 grams of butadiene-1,3 monomer. Suitable hydrocarbon solvents for the butadiene or its polymer can be used.

The lithium-based catalyst can be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are, for instance, alkyllithium compounds such as methyllithium, ethyllithium, butyllithium, amyllithium, hexyllithium, 2-ethyl-hexyllithium and n-hexadecyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyl-lithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, and the like. Tri- and higher lithium hydrocarbons are also suitable, such as 1,3,5-trilithium pentane or 1,3,5-trilithium benzene. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion (the lithium losing an electron to serve as the cation) of the salt. It should be understood that metallic lithium or the various lithium compounds may be used either alone, or in any combination as mixtures with each other.

Polymerization by a lithium-based catalyst is described in British Patent 817,693. This patent discloses polymers of butadiene of substantially 30 to 40 percent content of cis-1,4-structure.

Analysis of polybutadienes by infrared technique is described in Analysis of Polybutadienes and Butadiene-Styrene Copolymers by Infrared Spectroscopy by John L. Binder in Analytical Chemistry, vol. 26, No. 27, December 1954, and analyses referred to herein were determined by that method.

The butadiene polymers to which this invention relates are subject to decomposition. Both heat and light form a surface skin or gel which turns to various shades of yellow or brown. Such decomposition affects the color and physical properties of the raw polymers, the milling of the raw polymers, and the processing of the compounded polymers, as well as the physical properties of the unaged and aged vulcanizates.

Various stabilizers have been proposed for use with butadiene polymers. Some of these cause discoloration or do not prevent discoloration which would occur in their absence. Some of the stabilizer mixtures of this invention do not discolor and prevent or retard discoloration in the polymers upon oven aging or natural light aging, and others produce or permit only slight discoloration. Also the stabilizers of this invention prevent or substantially inhibit the formation of gel.

The stabilizing action of this invention is dependent upon the use of two different components, as follows:

*Component 1.*—A compound of the class having the formula

in which each X is a radical from the class consisting of (a) 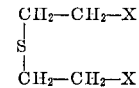

in which R is an alkyl group containing 1 to 18 carbon atoms; of which the following are representative:

Dimethyl β,β'-thiodipropionate
Dilauryl β,β'-thiodipropionate
Distearyl β,β'-thiodipropionate (b) 

namely, β,β'-thiodipropionamide (c) 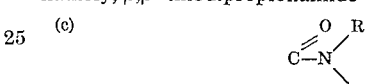

in which each R is an alkyl radical containing 1 to 12 carbon atoms, of which the following are representative:

N,N-dimethyl β,β'-thiodipropionamide
N,N-dioctyl β,β'-thiodipropionamide
N,N-didecyl β,β'-thiodipropionamide
N,N-didodecyl β,β'-thiodipropionamide (d) C≡N, namely β,β'-thiodipropionitrile and (e) 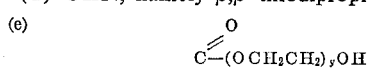

in which y is a whole number from 1 to 20, of which the following are representative:

Di(2-hydroxyethyl)β,β'-thiodipropionate
Di(polyethylene glycol)β,β'-thiodipropionate and

*Component 2.*—A compound of the class consisting of:
(a) cyclohexylated, cyclopentylated, alpha-methyl cyclohexylated and alpha-cyclopentylated phenols, cresols and xylenols and mixtures thereof in which there are substituents in the 2-, 4- and 6-positions, and especially a mixture in which there are substituents in substantially all of said positions in each compound of the mixture.

Representative compounds utilizable as Component 2 are: compounds above defined produced according to U.S. 2,839,493.

The mixture of alpha-methylcyclohexylated cresols and xylenols known as Nonox WSL. Compounds such as the following, either used alone or in mixtures:

4-methyl-2,6-di(alpha-methylcyclohexyl)phenol
2-methyl-4,6-di(alpha-methylcyclohexyl)phenol
2,4-dimethyl-6-(alpha-methylcyclohexyl)phenol
2,6-dimethyl-4-(alpha-methylcyclohexyl)phenol
2-alpha-methylcyclohexyl-4,6-dimethylphenol
2-cyclohexyl-4,6-dimethylphenol
2-alpha-methylcyclopentyl-4,6-dimethylphenol
2-cyclopentyl-4,6-dimethylphenol (b) compounds of the class consisting of

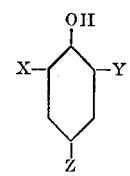

in which X is a primary or secondary phenylalkyl radical having 1 to 3 carbon atoms in the alkyl group, Y is a tertiary-alkyl] radical having 4 to 12 carbon atoms, and Z is a primary or secondary alkyl radical having 1 to 4 carbon atoms.

Representative materials utilizable as Component 2(b) are products such as those known commercially as Wingstay V and Cyanox LF (each of which is a mixture of alkylated styrenated phenols) and compounds of which the following are illustrative:

2-t-butyl-4-methyl-6-(alpha-methylbenzyl) phenol
2-t-octyl-4-butyl-6-(alphamethylbenzyl) phenol
2-t-octyl-4-methyl-6-(alpha-methylbenzyl) phenol
2-(alpha-methylbenzyl)-4-isopropyl-6-t-butyl phenol
2-(alpha-methylbenzyl)-4-ethyl-6-t-octyl phenol
2-(alpha-methylbenzyl)-4-n-butyl-6-t-butyl phenol (c) a mixture of compounds, each having the formula

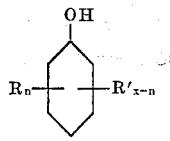

in which $x$ is selected from the group consisting of 2 and 3;
$n$ is selected from the group consisting of 0, 1, 2 and 3, but does not exceed the value of $x$;
R is selected from the group consisting of t-butyl and t-amyl;
R' is selected from the group consisting of t-octyl and t-nonyl; and
R and R' being attached to the benzene ring in the 2, 4 and 6 positions;

A major portion of said mixture being composed of tri-t-alkylated phenols in which two of said three alkyl groups are selected from the class consisting of t-octyl and t-nonyl groups, and in which the third t-alkyl group is selected from the class consisting of t-butyl and t-octyl groups:

The materials utilizable as Component 2(c) include the product known commercially as Wingstay T, and also the products and mixtures covered by the formula for Component 2(c) and disclosed in the examples of British Patent 758,474, including reaction products of phenol, diisobutylene and isobutylene in the following ratios: 1:2:1, 1:1:2, 1:1.25:1.75, 1:1.5:1.5, 1:1.75:1.25, 1:1.5:1.75, 1:2:1.25, 1:2:1.5 and 1:2:0; the reaction product of nonylphenol and isobutylene in the ratio of 1:2, the reaction product of phenol, tripropylene and isobutylene in the ratio of 1:1:2; and also 2,4-ditertiary-octyl-6-tertiary-butyl phenol and 2,6-di-tertiary-butyl-4-tertiary-octyl phenol.

(d) compounds having the formula

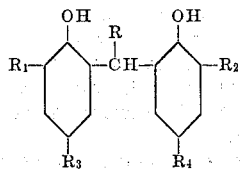

in which

R is from the class consisting of hydrogen and alkyl groups containing 1 to 3 carbon atoms;
$R_1$ and $R_2$ are each a t-alkyl group containing 4 to 12 carbon atoms, which may be the same or different; and
$R_3$ and $R_4$ are each an alkyl group containing 1 to 4 carbon atoms, and may be the same or different.

Component 2(d) includes products known as CAO 14, CAO 5, AO 2246 and Nonox WSP. It also includes compounds such as the following:

2,2'-methylene-bis (4-methyl-6-t-butylphenol)
2,2'-ethylidene-bis(4-ethyl-6-t-octylphenol)
2,2'-butylidene-bis(4-butyl-6-t-dodecylphenol)
2,2'-propylidene-bis(4-methyl-6-t-nonylphenol)
2,2'-methylene-bis(4-methyl-6-alpha-methylcyclohexylphenol)
2,2'-butylidene-bis(4-ethyl-6-alpha-methylcyclohexylphenol)
2,2'-methylene-bis(4-propyl-6-t-butylphenol)
2,2'-methylene-bis(4-methyl-6-t-undecylphenol)

(e) compounds having the formula

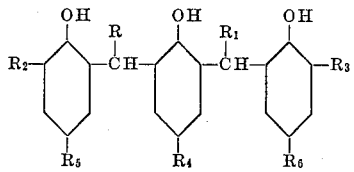

in which

R and $R_1$ are from the class consisting of hydrogen and alkyl groups containing 1 to 3 carbon atoms, and may be the same or different;
$R_2$ and $R_3$ are each a t-alkyl group containing 4 to 12 carbon atoms, and may be the same or different;
$R_4$ is from the class consisting of hydrogen and alkyl groups containing 1 to 4 carbon atoms; and
$R_5$ and $R_6$ are each an alkyl group containing 1 to 4 carbon atoms, and may be the same or different.

The product known as AO 80 may be used as Component 2(e), as also may compounds such as the following:

2,6-bis(2'-hydroxy-3'-t-butyl-5'-methylbenzyl)-4-methylphenol
2,6-bis(2'-hydroxy-3'-t-octyl-5'-ethylbenzyl)-4-ethylphenol
2,6-bis(2'-hydroxy-3'-t-dodecyl-5'-butylbenzyl)-4-methylphenol
2,6-bis(2'-hydroxy-3'-t-undecyl-5'-propylbenzyl)-4-propylphenol
2,6-bis(2'-hydroxy-3'-t-nonyl-5'-methylbenzyl)-4-butylphenol
2,6-bis(2'-hydroxy-3'-t-octyl-5'-methylbenzyl)-4-methylphenol
2,6-bis(2'-hydroxy-3'-t-octyl-5'-ethylbenzyl)-4-methylphenol
2,6-bis(2'-hydroxy-3'-t-nonyl-5'-propylbenzyl)-4-methylphenol
2,6-bis(2'-hydroxy-3'-t-butyl-5'-ethylbenzyl)-4-propylphenol
2,6-bis(2'-hydroxy-3'-t-octyl-5'-ethylbenzyl)-4-methylphenol (f) N-acyl-p-aminophenols in which the acyl group contains 4 to 18 carbon atoms.

Component 2(f) is a product such as Succonox 12, or compounds such as

N-lauroyl-p-aminophenol
N-stearoyl-p-aminophenol
N-(n-caproyl)-p-aminophenol
N-(n-valeroyl)-p-aminophenol (g) 4,4'-di-t-alkyl diphenylamines in which the alkyl groups each contain 4 to 12 carbon atoms.

Representative materials utilizable as Component 2(g) include:

4,4'-di-t-octyldiphenylamine (known commercially as Octamine and Agerite Stalite S)
4,4'-di-t-nonyldiphenylamine (known commercially as Polylite)
4,4'-di-t-butyldiphenylamine
4,4'-di-t-dodecyldiphenylamine (h) compounds having the formula

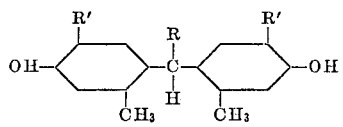

in which R is an alkyl group which contains 1 to 4 carbon atoms and each R' is a t-alkyl containing 4 to 12 carbon atoms.

Compounds representative of those which may be used as Component 2(h) include Santowhite Powder which is 4,4'-butylidene-bis(2-t-butyl-5-methylphenol) and, for example:

4,4'-methylene-bis(2-t-dodecyl-5-methylphenol)
4,4'-ethylidene-bis(2-t-octyl-5-methylphenol)
4,4'-ethylidene-bis(2-t-nonyl-5-methylphenol)

(i) 2,4,6 - tri - alpha - methylbenzylphenol (styrenated phenol) which is known commercially as Wingstay S, Agerite Spar, and Styphen I.

The total amount of the two components used will be from 0.1 to 2.5 parts per 100 parts of the polymer. The amounts of the various components used, per 100 parts of the polymer will be:

| | Parts |
|---|---|
| Component 1 | 0.05–1.5 |
| Component 2 | 0.05–1.0 |

Generally, the amount of Component 1 is greater than that of Component 2.

The following test results illustrate the synergistic effect of the use of the two components in polybutadiene made by solution polymerization with butyllithium or equivalent lithium-based catalyst and having the following or an equivalent structure as determined by infrared technique: substantially 35 to 37 percent cis-1,4-structure and substantially 8 to 10 percent 1,2-structure, the balance being trans-1,4-structure.

The mixtures of polybutadiene and stabilizer were subjected to (1) aging 2 days in an oven at 100° C. with air circulation, and (2) aging in sunlight for 30 days. Such polybutadiene which contains Component 1 or 2 separately exhibits poor aging characteristics, including high gel and poor color. It is seen that the two-component mixtures have a beneficial synergistic effect on the color of the final products and limit the amount of gel produced, the production of gel being the result of a combination of the polymer with oxygen or the formation of cross links. Polymers with a gel content of over about five percent are difficult to process.

In the table the various products qualifying as Component 2 are named. In the tests, five-tenths part of a Component 2 was mixed with 1.0 part of dilauryl β,β'-thiodipropionate per 100 parts of the polybutadiene.

It is to be understood that mixtures of compounds included within the class of Component 2 may be used.

Compounds belonging to the groups identified above as 2(a), (b) and (c) are nondiscoloring, i.e., when subjected to heat and light such as that to which they were subjected in tests to be described, they did not discolor and prevented discoloration which would otherwise occur. Compounds of the other groups discolor only very slightly or permit only slight discoloration. The latter are usable in tinted or colored rubber compounds, whereas the others are usable in white compounds.

In the table trade names are used to represent the following:

Nonox WSL is essentially a mixture of alpha-methylcyclohexylated cresols and xylenols with substituents in the 2-, 4- and 6-positions.

Wingstay V is a mixture of alkylated styrenated phenols produced according to the disclosure of British Patent 818,035, and for the purpose of this specification may be assumed to be essentially either 2-(alpha-methylbenzyl)-4-methyl-6-t-butyl phenol or 2-(alpha-methylbenzyl)-4-methyl-6-t-octyl phenol or a mixture of these.

Cyanox L is a commercial product almost identical to Wingstay V and is essentially either 2-(alpha-methylbenzyl)-4-methyl-6-t-butyl phenol or 2-(alpha-methylbenzyl)-4-methyl-6-t-octyl phenol or a mixture of these.

Wingstay T is a product made according to British Patent 758,474 and for the purpose of this invention may be assumed to be the reaction product of phenol, diisobutylene and isobutylene reacted in the ratio of 1:2:1.

CAO 14, AO 2246 and CAO 5 represent, respectively, quite pure, less pure and rather impure grades of 2,2'-methylene-bis(4-methyl-6-t-butylphenol).

AO 80 is 2,6-bis(2'-hydroxy-3'-t-butyl-5'-methylbenzyl)-4-methylphenol.

Succonox 12 is N-lauroyl-p-aminophenol.

Octamine is 4,4'-di-t-octyl-diphenylamine.

Wingstay S is tri-alpha-methylbenzylphenol.

In the table, colors are reported using the following abbreviations:

Al=Almost
Br=Brown
Cr=Cream
Lt=Light
P=Pale
Sl=Slight
Tr=Trace (meaning almost imperceptible)
V=Very
WW=Water White
Yel=Yellow

TABLE

| Stabilizer | After oven aging | | After exposure to sunlight, Color |
|---|---|---|---|
| | Color | Gel, (percent) | |
| Nonox WSL | Al. WW | 0 | Al. WW. |
| Wingstay V | Al. WW | 0 | Al. WW. |
| Wingstay T | Al. WW | 0 | Al. WW. |
| Cyanox L | Al. WW | 0 | Al. WW. |
| AO 2246 | Light Cr | 0 | V. Sl. Tr. Yel. |
| CAO 14 | Tr. Lt. Cr | 0 | V. Sl. Tr. Yel. |
| CAO 5 | Tr. Lt. Cr | 0 | V. Sl. Tr. Yel. |
| AO 80 | Lt. P. Br | 0 | V. Sl. Tr. Gray. |
| Succonox 12 | Tr. Lt. Cr | 0 | Al. WW. or Tr. Lt. Yel. |
| Octamine | Tr. Lt. Yel | 0 | P. Yel. |
| 4,4'-ethylidenebis-(2-t-butyl-5-methylphenol). | V. Lt. Cr | 0 | Al. WW. |
| Wingstay S | Tr. Lt. Yel | 1.0 | Al. WW. |

The table shows that the synergistic mixtures employing these particular components give very satisfactory results. The formulae for the various Components 2 are drawn somewhat more broadly to cover the classes of compounds to which the tested components belong.

What I claim is:

1. Polybutadiene having incorporated therein 0.15 to 2.5 parts of a stabilizer mixture per 100 parts of the polymer in order to maintain the gel content below 5 percent, the polymer being stereolinear due to polymerization with a lithium-based catalyst and exhibiting by infrared technique substantially 30 to 40 percent of cis-1,4-structure and substantially 6 to 15 percent 1,2-structure, the balance being trans-1,4-structure;

the stabilizer mixture being composed of 0.05 to 1.5 parts of Component 1 which has the formula

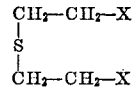

in which each X is a radical from the class consisting of (a) 

in which R is an alkyl radical containing 1 to 18 carbon atoms, (b) 

(c) 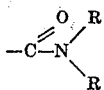

in which each R is an alkyl radical containing 1 to 12 carbon atoms, (d) —C≡N, and (e) 

in which y is a whole number from 1 to 20; and 0.05 to 1.0 part of Component 2 which is a material selected from the class consisting of (a) a compound of the class consisting of cyclohexylated, cyclopentylated, alpha-methylcyclohexylated and alpha-methylcyclopentylated phenol, cresols and xylenols having substituents in the 2-, 4- and 6-positions, (b) compounds having the formula

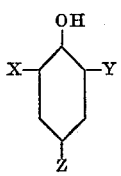

in which X is selected from the class of primary and secondary phenylalkyl radicals having 1 to 3 carbon atoms in the alkyl groups, Y is a tertiary-alkyl radical having 4 to 12 carbon atoms, and Z is selected from the class of primary and secondary alkyl radicals having 1 to 4 carbon atoms, (c) a mixture of compounds, each having the formula

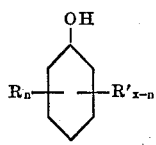

in which
  x is selected from the group consisting of 2 and 3;
  n is selected from the group consisting of 0, 1, 2 and 3, but does not exceed the value of x;
  R is selected from the group consisting of t-butyl and t-amyl;
  R' is selected from the group consisting of t-octyl and t-nonyl; and
  R and R' being attached to the benzene ring in the 2, 4 and 6 positions;
a major portion of said mixture being composed of tri-t-alkylated phenols in which two of said three alkyl groups are selected from the class consisting of t-octyl and t-nonyl groups, and in which the third t-alkyl group is selected from the class consisting of t-butyl and t-octyl groups, (d) compounds having the formula

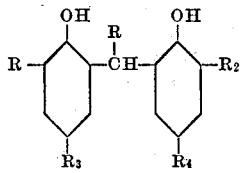

in which
  R is from the class consisting of hydrogen and alkyl groups containing 1 to 3 carbon atoms;
  $R_1$ and $R_2$ are each a t-alkyl group containing 4 to 12 carbon atoms; and $R_3$ and $R_4$ are each an alkyl group containing 1 to 4 carbon atoms, (e) compounds having the formula

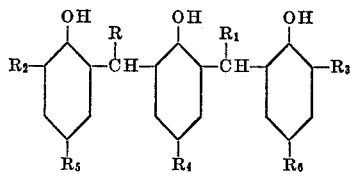

in which
  R and $R_1$ are from the class consisting of hydrogen and alkyl groups containing 1 to 3 carbon atoms;
  $R_2$ and $R_3$ are each a t-alkyl group containing 4 to 12 carbon atoms;
  $R_4$ is from the class consisting of hydrogen and alkyl groups containing 1 to 4 carbon atoms; and
  $R_5$ and $R_6$ are each an alkyl group containing 1 to 4 carbon atoms, (f) N-acyl-p-aminophenols in which the acyl group contains 4–18 carbon atoms, (g) 4,4'-di-t-alkyl diphenylamines in which the alkyl groups each contain 4 to 12 carbon atoms, (h) compounds having the formula

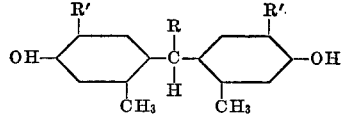

in which R is an alkyl group which contains 1 to 4 carbon atoms and each R' is a t-alkyl group containing 4 to 12 carbon atoms, and (i) 2,4,6-tri-alpha-methylbenzylphenol.

2. A stabilized polybutadiene of claim 1 in which Component 1 is dilauryl β,β'-thiodipropionate.

3. A stabilized polybutadiene of claim 1 in which Component 2 is Component 2(a).

4. A stabilized polybutadiene of claim 1 in which Component 2 is Component 2(b).

5. A stabilized polybutadiene of claim 1 in which Component 2 is Component 2(c).

6. A stabilized polybutadiene of claim 1 in which Component 2 is Component 2(d).

7. A stabilized polybutadiene of claim 1 in which Component 2 is Component 2(e).

8. A stabilized polybutadiene of claim 1 in which Component 2 is Component 2(f).

9. A stabilized polybutadiene of claim 1 in which Component 2 is Component 2(g).

10. A stabilized polybutadiene of claim 1 in which Component 2 is Component 2(h).

11. A stabilized polybutadiene of claim 1 in which Component 2 is Component 2(i).

12. A stabilized polybutadiene of claim 2 in which Component 2 is Component 2(a).

13. A stabilized polybutadiene of claim 2 in which Component 2 is Component 2(b).

14. A stabilized polybutadiene of claim 2 in which Component 2 is Component 2(c).

15. A stabilized polybutadiene of claim 2 in which Component 2 is Component 2(d).

16. A stabilized polybutadiene of claim 2 in which Component 2 is Component 2(e).

17. A stabilized polybutadiene of claim 2 in which Component 2 is Component 2(f).

18. A stabilized polybutadiene of claim 2 in which Component 2 is Component 2(g).

19. A stabilized polybutadiene of claim 2 in which Component 2 is Component 2(h).

20. A stabilized polybutadiene of claim 2 in which Component 2 is Component 2(i).

21. The stabilized polybutadiene of claim 6 in which Component 2(d) is 2,2'-methylene-bis(4-methyl-6-t-butylphenol).

References Cited

UNITED STATES PATENTS

| | | | |
|---|---|---|---|
| 2,819,329 | 1/1958 | Sullivan | 260—45.95 |
| 3,006,888 | 10/1961 | Reynolds | 260—45.95 |
| 3,080,338 | 3/1963 | Nudenberg et al. | 260—45.95 |
| 3,093,587 | 6/1963 | Ecke et al. | 260—45.95 |
| 3,177,166 | 4/1965 | Gregory et al. | 260—45.95 |
| 3,243,408 | 3/1966 | Donoian | 260—45.85 |
| 3,265,660 | 8/1966 | Burgess et al. | 260—45.95 |
| 3,277,060 | 10/1966 | Bell et al. | 260—45.95 |
| 3,313,772 | 4/1967 | Moss et al. | 260—45.85 |

FOREIGN PATENTS 929,435  6/1963  Great Britain.

DONALD E. CZAJA, *Primary Examiner.*

H. E. TAYLOR, JR., *Assistant Examiner.*

UNITED STATES PATENT OFFICE
CERTIFICATE OF CORRECTION

Patent No. 3,400,099                          September 3, 1968

Wendell S. Cook

It is certified that error appears in the above identified patent and that said Letters Patent are hereby corrected as shown below:

Column 5, line 12, "2-t-octyl-4-butyl-6-(alphamethylbenzyl)-phenol" should read -- 2-t-octyl-4-n-butyl-6-(alpha-methylbenzyl)phenol --. Column 9, lines 63 to 70, the left-hand portion of the formula should appear as shown below:

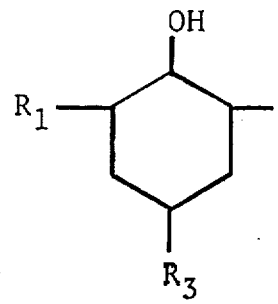

Signed and sealed this 3rd day of March 1970.

(SEAL)
Attest:

EDWARD M. FLETCHER, JR.                      WILLIAM E. SCHUYLER, JR.
Attesting Officer                                Commissioner of Patents